US007865282B2

(12) United States Patent
Murlidar et al.

(10) Patent No.: US 7,865,282 B2
(45) Date of Patent: Jan. 4, 2011

(54) METHODS OF MANAGING COMMUNICATIONS FOR AN IN-VEHICLE TELEMATICS SYSTEM

(75) Inventors: Jaycee Murlidar, Troy, MI (US); Nathan D. Ampunan, Novi, MI (US); Jason W. Clark, Grosse Pointe Woods, MI (US); Ryan J. Wasson, Grosse Pointe Park, MI (US); John P. Weiss, Shelby Township, MI (US)

(73) Assignee: General Motors LLC, Detroit, MI (US)

( * ) Notice: Subject to any disclaimer, the term of this patent is extended or adjusted under 35 U.S.C. 154(b) by 1139 days.

(21) Appl. No.: 11/525,648

(22) Filed: Sep. 22, 2006

(65) Prior Publication Data

US 2008/0077310 A1 Mar. 27, 2008

(51) Int. Cl.
*H04M 3/20* (2006.01)

(52) U.S. Cl. .................... 701/36; 455/569.2; 455/569.1

(58) Field of Classification Search ................ 701/117, 701/1, 36; 704/270; 705/51; 455/552.1, 455/575.9, 41.2, 569.1, 569.2
See application file for complete search history.

(56) References Cited

U.S. PATENT DOCUMENTS 6,289,332 B2 * 9/2001 Menig et al. ................... 707/1
6,871,067 B2 * 3/2005 Clark et al. ................. 455/428
6,957,128 B1 * 10/2005 Ito et al. ........................ 701/1
2002/0098853 A1 7/2002 Chrumka
2003/0130850 A1 * 7/2003 Badt et al. .................. 704/270
2003/0182233 A1 * 9/2003 Mocek et al. ................. 705/51
2003/0210159 A1 * 11/2003 Arunkumar ................. 340/988
2005/0075128 A1 * 4/2005 Diedrich et al. .......... 455/552.1

* cited by examiner

*Primary Examiner*—Thomas G Black
*Assistant Examiner*—Ce Li
(74) *Attorney, Agent, or Firm*—Dierker & Associates, P.C.

(57) ABSTRACT

A method of managing communications for an in-vehicle telematics system includes substantially simultaneously receiving requests for communicating first and second audio signals via a vehicle audio system. The signals respectively correspond to interactive voice services (provided via a menu dialogue) from a first in-vehicle system and to a first audio messaging from a second in-vehicle system. An arbitration control selects one of the signals as a priority output and the other as a subordinate output. The priority output is provided over the audio system. A queue manager maintains the subordinate output in a queue for outputting over the audio system after priority output completion. If the first signal is the subordinate output, then the queue manager maintains a state of the menu dialogue, as of a time the priority output is selected, for continuation of the menu dialogue from the maintained state after priority output completion.

13 Claims, 3 Drawing Sheets

METHODS OF MANAGING COMMUNICATIONS FOR AN IN-VEHICLE TELEMATICS SYSTEM

TECHNICAL FIELD

The present disclosure relates generally to in-vehicle telematics systems, and more particularly to methods of managing communications for an in-vehicle telematics system.

BACKGROUND

An increasing number of vehicles are equipped with telematics systems, which enable communication between the vehicle and one or more communications systems such as, for example, telephone systems, navigation systems, and/or Bluetooth® enabled devices such as, for example, a PDA or a cellular phone with PDA features.

Generally speaking, vehicles are capable of communicating with one system at a given time. As such, other communications may be missed that are attempted while the vehicle communicates with that one system. Alternatively, ongoing communications (e.g., a phone call) may be interrupted by an incoming communication (e.g., navigation instructions). Such an interruption may cause a loss of information relating to the interrupted communication. Generally, the interrupted communication may be reinitiated, but not resumed, after completion of the interrupting communication. Reinitiating the interrupted communication may be time-consuming and/or inconvenient for a user.

As such, it would be desirable to provide an improved method of managing communications with an in-vehicle telematics system.

SUMMARY

A method of managing communications for an in-vehicle telematics system includes substantially simultaneously receiving, at the in-vehicle telematics unit, requests for communicating, via a vehicle audio system, a first audio signal corresponding to interactive voice services from a first in-vehicle system and a second audio signal corresponding to a first audio messaging from a second in-vehicle system. The interactive voice services are provided to a user through at least one menu dialogue. An arbitration control in the in-vehicle telematics unit selects one of the first and second audio signals as a priority output and another of the second and first audio signals as a subordinate output. The priority output is provided over the vehicle audio system. A queue manager maintains the subordinate output in a queue for outputting over the vehicle audio system after completion of the priority output. If the first audio signal is the subordinate output, then the queue manager maintains a state of the menu dialogue(s), as of a time the priority output is selected, for continuation of the menu dialogue(s) from the maintained state after the completion of the priority output.

BRIEF DESCRIPTION OF THE DRAWINGS

Objects, features and advantages of examples of the present disclosure may become apparent by reference to the following detailed description and drawings, in which like reference numerals correspond to similar, though not necessarily identical components. For the sake of brevity, reference numerals having a previously described function may not necessarily be described in connection with other drawings in which they appear.

DETAILED DESCRIPTION

Embodiment(s) of the system(s) and method(s) disclosed herein advantageously allow one or more communications with one or more in-vehicle systems to be queued based upon priority of the communication(s). A queued communication may be resumable, whereby a user may re-establish communication at the state (i.e., time, point, and/or configuration (e.g., at an intermediate menu of a vehicle menu structure)) where the communication was disrupted by the queuing. It is believed that such a system may assist users in prioritizing, organizing, and/or managing multiple, substantially simultaneous in-vehicle communications.

It is to be understood that, as defined herein, a user may include vehicle operators and/or passengers.

Figure 1:
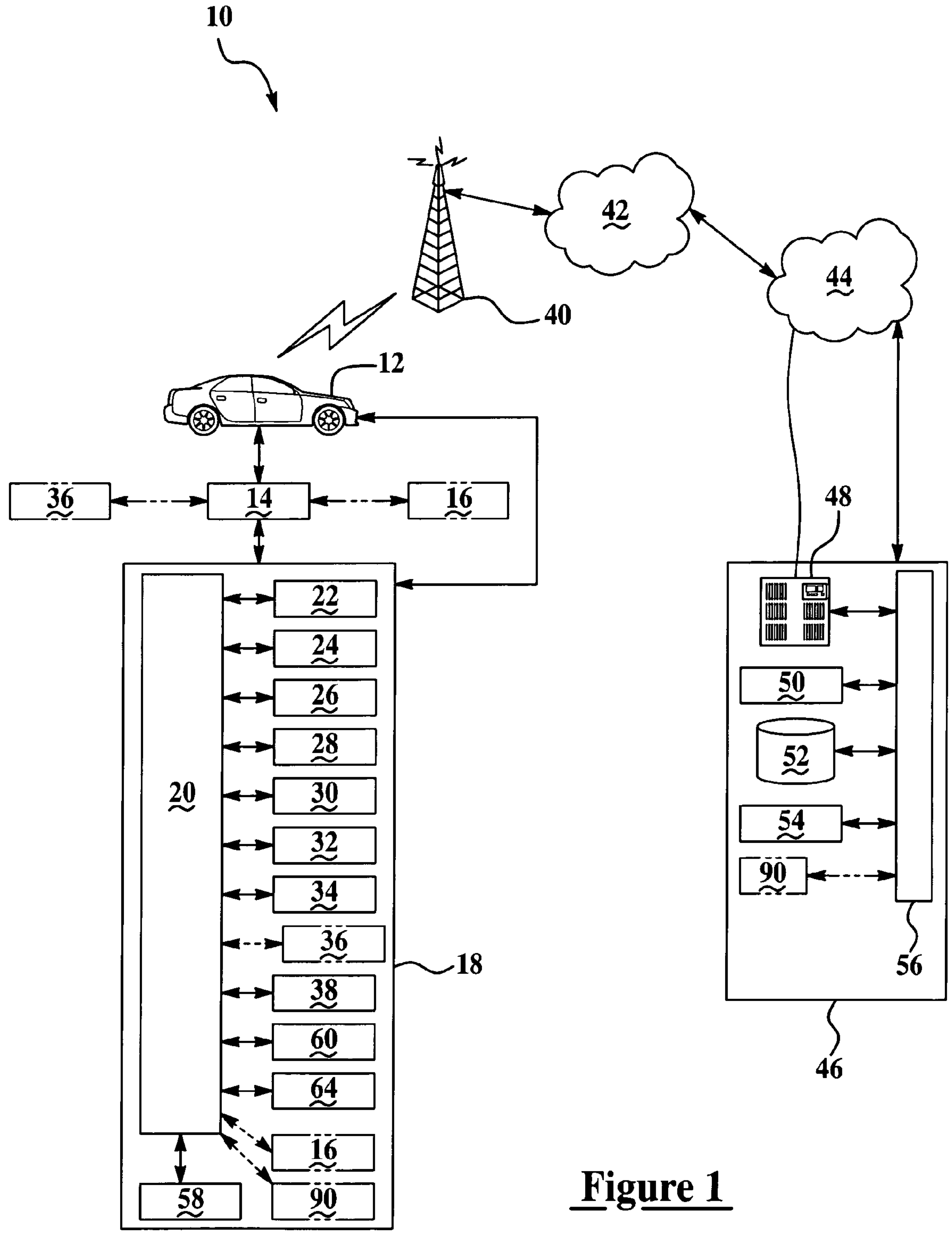
FIG. 1 is a schematic diagram depicting an embodiment of an in-vehicle telematics system.

Referring now to FIG. 1, the system 10 includes a vehicle 12, a vehicle communications network 14, a telematics unit/system 18, a wireless communication system (including, but not limited to, one or more wireless carrier systems 40, one or more communication networks 42, and/or one or more land networks 44). In an embodiment, the wireless communication system is a two-way radio frequency communication system. In another embodiment, the wireless communication system includes one or more service providers/call centers 46. In yet another embodiment, vehicle 12 is a mobile vehicle with suitable hardware and software for transmitting and receiving voice and data communications. System 10 may include additional components suitable for use in telematics units 18.

In an embodiment, via vehicle communications network 14, the vehicle 12 sends signals from the telematics unit 18 to various units of equipment and systems 16 within the vehicle 12 to perform various functions, such as unlocking a door, executing personal comfort settings, and/or the like. In facilitating interaction among the various communications and electronic modules, vehicle communications network 14 utilizes interfaces such as controller area network (CAN), ISO standard 11989 for high speed applications, ISO standard 11519 for lower speed applications, and Society of Automotive Engineers (SAE) standard J1850 for high speed and lower speed applications.

The telematics unit 18 may send and receive radio transmissions from wireless carrier system 40. In an embodiment, wireless carrier system 40 may be a cellular telephone system and/or any other suitable system for transmitting signals between the vehicle 12 and communications network 42. Further, the wireless carrier system 40 may include a cellular communication transceiver, a satellite communications transceiver, a wireless computer network transceiver (a non-limiting example of which includes a Wide Area Network (WAN) transceiver), and/or combinations thereof.

The communications network 42 may include services from one or more mobile telephone switching offices and/or wireless networks. Communications network 42 connects wireless carrier system 40 to land network 44. Communications network 42 may be any suitable system or collection of systems for connecting the wireless carrier system 40 to the vehicle 12 and the land network 44.

The land network 44 connects the communications network 40 to the call center 46. In one embodiment, land network 44 is a public switched telephone network (PSTN). In another embodiment, land network 44 is an Internet Protocol (IP) network. In still other embodiments, land network 44 is a wired network, an optical network, a fiber network, another wireless network, and/or any combinations thereof. The land network 44 may be connected to one or more landline telephones. It is to be understood that the communications network 42 and the land network 44 connect the wireless carrier system 40 to the call center 46.

Call center 46 contains one or more data switches 48, one or more communication services managers 50, one or more communication services databases 52 containing subscriber profile records and/or subscriber information, one or more communication services advisors 54, and one or more network systems 56.

Switch 48 of call center 46 connects to land network 44. Switch 48 transmits voice or data transmissions from call center 46, and receives voice or data transmissions from telematics unit 18 in vehicle 12 through wireless carrier system 40, communications network 42, and land network 44. Switch 48 receives data transmissions from, or sends data transmissions to one or more communication service managers 50 via one or more network systems 56.

Call center 46 may contain one or more service advisors 54. In one embodiment, service advisor 54 may be human. In another embodiment, service advisor 54 may be an automaton. It is to be understood that the service advisor 54 may be located at the call center 46 or may be located remote from the call center 46 while communicating therethrough.

The telematics unit 18 may include a processor 20 operatively coupled to various in-vehicle systems 16, non-limiting examples of which include a wireless modem 22, a location detection system 24 (a non-limiting example of which is a global positioning system (GPS)), an in-vehicle memory 26, a microphone 28, one or more speakers 30, an embedded or in-vehicle mobile phone 32, an arbitration control 36, a short-range wireless communication network 38 (e.g. a Bluetooth® unit), a queue manager 60, a display system 64, and/or a navigation system 90 operatively located within vehicle 12.

It is to be understood that the navigational system 90 may be embodied in any suitable form. In one embodiment, a server-based navigational system 90 may calculate a route at the call center 46 and then transmit a list of navigation maneuvers to the telematics unit 18. The telematics unit 18, in conjunction with the location detection system 24, may present the maneuver instructions to the subscriber aurally, in real time. In this embodiment, the navigation system 90 is integral with the telematics unit 18. In another embodiment, an autonomous navigation system 90 is an on-board, stand-alone unit that contains its own user interface, destination entry system (including, for example, a keyboard and/or buttons), location sensors, and/or a digital map database. An autonomous navigation system 90 may be loosely coupled, if at all, to the telematics system 18.

As used herein, the phrase "in-vehicle system 16" is to be interpreted broadly, and includes a system that is at least partially operatively disposed within the telematics unit 18 or within some other portion of the vehicle 12, or a system that is in operative communication with the telematics unit 18 and/or the vehicle 12. It is to be understood that the terms "system 16" and "in-vehicle system 16" may be used interchangeably herein, in accordance with such interpretation.

Non-limiting examples of the location detection system 24 include a Global Position Satellite receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). In-vehicle mobile phone 32 may be a cellular type phone, such as, for example an analog, digital, dual-mode, dual-band, multi-mode and/or multi-band cellular phone.

Processor 20 may be a micro controller, a controller, a microprocessor, a host processor, and/or a vehicle communications processor. In another embodiment, processor 20 may be an application specific integrated circuit (ASIC). Alternatively, processor 20 may be a processor working in conjunction with a central processing unit (CPU) performing the function of a general-purpose processor.

Associated with processor 20 is a real time clock (RTC) 34 providing accurate date and time information to the telematics unit hardware and software components that may require date and time information. In one embodiment date and time information may be requested from the RTC 34 by other telematics unit components. In other embodiments, the RTC 34 may provide date and time information periodically, such as, for example, every ten milliseconds.

It is to be understood that software 58 may be associated with processor 20 for monitoring and/or recording of incoming caller utterances.

Processor 20 may execute various computer programs that interact with operational modes of electronic and mechanical systems within the vehicle 12. It is to be understood that processor 20 controls communication (e.g. call signals) between telematics unit 18, wireless carrier system 40, and call center 46.

Further, processor 20 may generate and accept digital signals transmitted between the telematics unit 18 and the vehicle communication network 14, which is connected to various electronic modules in the vehicle 12. In one embodiment, these digital signals activate the programming mode and operation modes within the electronic modules, as well as provide for data transfer between the electronic modules. In another embodiment, certain signals from processor 20 may be translated into vibrations and/or visual alarms.

It is to be understood that the telematics unit 18 may be implemented without one or more of the above listed components, such as, for example, location detection system 24. Yet further, it is to be understood that the location detection system 24 may be a component of another vehicle system 16 or a stand-alone device. Telematics unit 18 may include additional components and functionality as desired for a particular end use.

As previously indicated, the telematics unit 18 may be in communication with one or more in-vehicle systems 16. Non-limiting examples of such systems 16 include the in-vehicle or mobile phone 32 and/or the navigation system 90. Some of the in-vehicle systems 16 offer services, such as, for example, an interactive voice service, an interactive voice menu, and/or audio messaging.

In an embodiment, an operator/user may initiate a call or a request, such as, for example, for telephone communication or a navigation communication, via an input system in communication with the telematics unit 18 and/or the two-way radio frequency communication system. Initiation of the request may be verbal and/or via a physical motion. As such, the input system may include an alphanumeric keypad, a microphone 28, a menu selection system, and/or combinations thereof.

Physically initiating a request may be accomplished via an input device such as, for example, microphone 28, a keyboard, a button press, a touch screen, and/or the like located in the vehicle 12. It is to be understood that the button press or touch screen is operatively connected to the telematics unit 18. Upon the user's initiation of the button press or touch screen, the telematics unit 18 may signal the appropriate on-board system 16 or the call center 46 of the fact that the user has initiated a request.

Verbal communication may take place via microphone 28 coupled to the in-vehicle or mobile phone 32 associated with the telematics unit 18. Caller utterances into the microphone 28 may be received at the telematics unit 18, and may be transmitted to the call center 46, which tokenizes the utterance stream for further processing. In one embodiment, the tokenized utterances are placed in a subscriber information database 52 at the call center 46.

In-vehicle systems 16 that include an interactive touch or voice service or menu allow a user to navigate the particular system 16 via a menu dialog. With an interactive touch service/menu, the vehicle user may input information or requests via a touch screen. With an interactive voice service/menu, the vehicle user may verbally request a service (e.g., dialing a phone number), or request that he/she be directed to a particular area of the menu. The interactive voice service/menu may include an automaton, which responds to the user's verbal requests/responses. In an alternate embodiment, if the system 16 is in operative communication with a call center 46, the interactive voice service/menu may include a human advisor who communicates with the user.

In an embodiment, the subscriber initiates communication with the service advisor 54 at the call center 46 by requesting a service. In response, the service advisor 54 may access the service and make it available to the subscriber. This process may be scripted or menu driven, whereby the service advisor 54 is able to deliver services in a consistent fashion to a multitude of subscribers. As a non-limiting example, a subscriber may interact with a service advisor 54 (live or automaton) by requesting directions or a route to a destination.

In an embodiment utilizing a human advisor 54, the advisor 54 states and verifies the subscriber's current location, and solicits a destination (e.g., an address) from the subscriber. The advisor 54 may then refer to a screen displaying the subscriber's current location superimposed over a digital map. The advisor 54 may generate one or more routes, and may offer one or more routing options to the subscriber. Non-limiting examples of routing options include those routes having the shortest time, shortest distance, toll avoidance, highway avoidance, scenic route, and/or the like, and/or combinations thereof. As such, the advisor 54 presents the subscriber with a menu or set of route options, whereby the user may select a route and the advisor 54 may relay the selected route (directions) to the subscriber. In an embodiment, the advisor 54 provides the directions to the subscriber verbally. In another embodiment, the advisor 54 transmits turn-by-turn directions to the telematics unit 18, which relays the directions to the user.

In an embodiment utilizing an automaton 54, the subscriber provides the advisor 54 with the destination by uttering it into the microphone 28. The automaton 54 may calculate the route, and then download the turn-by-turn directions to the telematics unit 18. The automaton 54 may be configured to provide the subscriber with one or more routing options, as described hereinabove with respect to the human advisor 54.

In an embodiment, the in-vehicle system 16 may output (i.e., provide, play, etc.) one or more audio signals (e.g., communications from the interactive voice service, audio messaging, etc.) via an in-vehicle audio system (e.g., speakers 30). It is to be understood that an audio signal may include any signal or communication that may be provided aurally.

The in-vehicle system(s) 16 may communicate with the vehicle user in real-time (i.e., "live") and/or may provide pre-recorded information. The in-vehicle system(s) 16 may also provide for one-way or two-way communication. As non-limiting examples of two-way communication, if the system 16 includes a mobile phone 32, it may provide for real-time communication between the vehicle 12 and a call center 46 or a third party. As a non-limiting example, the vehicle user may request navigation instructions from the call center 46, which may include a navigation system 90. The call center 46 would then transmit the instructions to the telematics unit 18, which provides them to the user. If the system 16 includes a navigation system 90 that is integral with the telematics unit 18 (i.e., is controlled and/or executed by the processor 20), the system 90 may download navigational commands (e.g., directions) to the telematics unit 18, which provides them to the user via the vehicle audio system or display system 64 (described further hereinbelow). In this embodiment, the navigation system 90 is a virtual, server-based system that is integral with the telematics unit 18.

"One-way communication" is to be interpreted broadly and may include transmitting vehicle diagnostic data (which is collected at the telematics unit 18) to the call center 46. In an embodiment, one-way communication includes a data transmission, of which the subscriber may be unaware.

The telematics unit 18 also includes an arbitration control 36 coupled with and/or responsive to two or more in-vehicle systems 16. In an embodiment, the arbitration control 36 is coupled to the in-vehicle systems 16 via processor 20. The arbitration control 36 is capable of distinguishing between two or more signals that are transmitted to the telematics unit 18 substantially simultaneously. The signals may be from the same system 16 (e.g., the mobile phone 32) or from different systems 16 (e.g., the mobile phone 32 and the navigation system 90).

In a non-limiting example where an incoming communication is received while the subscriber is already on the telephone (or otherwise engaged in communication via the telematics system 18), a busy signal is generated and presented to the incoming caller.

In another non-limiting example where an incoming communication is received while the subscriber is already on the telephone (or otherwise engaged in communication via the telematics system 18), the telematics system 18 may present to the user (i.e., aurally and/or via an in-vehicle visual display) an incoming caller identification (ID). In addition to the call ID information, the user may be supplied with information regarding a priority level of the incoming call (e.g., if the user has assigned the particular caller as a high priority caller). The subscriber may then decide whether to suspend or terminate the current call and take the incoming call.

In an embodiment, when the in-vehicle system(s) 16 substantially simultaneously transmits two or more signals to the telematics system 18, the arbitration control 36 may assign a priority level to each of the signals, designating one of the signals a higher priority and one a lower priority.

It is to be understood that the priority levels assigned by the arbitration control 36 may correspond to previously designated priority levels. For example, emergency communications (e.g., police, fire, etc.) may be pre-assigned with a highest priority level. When such a call is received, the arbitration control 36 is capable of recognizing this pre-assigned priority level, and designates the call with a priority that corresponds to the pre-assigned priority. Other communications may be flagged by the user as having a pre-selected priority. It is to be understood, however, that some communications (e.g., emergency communications) may be set so that a user may not override the priority level.

For example, and as previously stated, the arbitration control 36 may be programmed to recognize emergency calls (i.e., from police, fire, or a call center) as having a higher priority level than other communications. It is to be understood that the system may, in some instances, prevent emergency calls from being set at a decreased priority level. Still further, the arbitration control 36 may set certain communications as higher priority during a potential crisis situation. For example, if a user is approaching an area where a crisis alert is active, incoming emergency notification messages and/or incoming phone calls (e.g., a previously queued incoming call) may be assigned higher priorities than outbound phone calls and/or navigational instructions. In yet another example, an incoming Amber Alert may take priority over other communications.

In another embodiment, the user may be able to set priority levels, such as, for example, indicating that calls received from home (or from any caller/object selected from a vehicle address book) have an increased priority level over other communications, such as navigational instructions. In yet another embodiment, navigational instructions may be set by a user to take priority over phone communications (including phone communications with one or more callers/objects designated in the address book).

User-selected priority levels for communications may be managed in a subscriber profile, which may be maintained at the call center. Such preferences are generally downloaded to the in-vehicle telematics unit 18 and are recognizable by the arbitration control 36. In an embodiment, a user/subscriber may update or create records in his or her profile by accessing a web page. As such, the subscriber may create a priority list of callers, whereby calls received from home or from family (i.e., spouse, parent, or child) are designated to take priority over other calls and/or communications.

After assigning the priority levels to the signals, the arbitration control 36 compares the priority levels, and transmits or provides the signal having the higher priority level (i.e., the priority output) to the user, for example, via the vehicle audio system. In another embodiment, the arbitration control 36 is configured to transmit/provide the signal via an in-vehicle visual display, such as, for example, a driver information center adapted to display text. It is to be understood that the arbitration control 36 may be adapted to select a priority output from any number of substantially simultaneous signals.

The lower priority signal(s) is designated the subordinate output and is sent to the queue manager 60 until completion of the priority output. Generally, the queue manager 60 maintains one or more of the subordinate outputs in a queue. If the queue manager 60 is holding two or more subordinate outputs, the outputs are organized according to their priority level. Once the priority output is complete, the queue manager 60 transmits the next highest priority level subordinate output to the vehicle audio system, and thus to the user.

It is to be understood that priority may be associated with the system 16 from which the signal is received and/or the communication. In a non-limiting example, communications received from emergency numbers may be considered high priority. In another non-limiting example, all information received from the navigation system 90 may be considered high priority. Furthermore, "priority" is to be interpreted broadly and may be at least partially dependent on urgency and/or importance of the communication.

In an embodiment, the arbitration control 36 may determine that two communications (e.g., a phone call and navigation route instruction) have the same priority level. In this embodiment, the system may simultaneously present both communications to the user via alternative devices. For example, one of the communications (e.g., the phone call) may be presented via the audio system, and the other of the communications (e.g., the navigation route instruction) may be presented via a display system (e.g., driver information center, radio display or interface, etc.).

The queue manager 60 may substantially or completely prevent a loss of status and/or information when an in-process, in-vehicle system 16 communication is temporarily queued to enable communication with an in-coming priority communication/signal. In an embodiment, the queue manager 60 provides a visual display, via a display system 64, of the queued communication(s), whereby the user may monitor the queued communications. The display system 64 may be adapted to be visible to the vehicle operator/passenger. In an embodiment, the display system 64 is an LCD display, a driver information center display, a radio display, an arbitrary text device, a heads-up display (HUD), a vacuum fluorescent display, and/or combinations thereof. In a non-limiting example, the display 64 is an alphanumeric driver information display that is also adapted to communicate vehicle diagnostic information, audio entertaining system status, compass heading, service interval, climate control system status, vehicle configuration setting, and/or combinations thereof.

In a non-limiting example embodiment, the system 10 includes a first in-vehicle system 16 which provides interactive voice services through at least one menu dialog, and second and third systems 16 which provide audio messaging. In this example, the user is in communication with the first in-vehicle system 16, which provides a first audio signal via the audio system. While the user is in communication with the first in-vehicle system 16, the second and third systems 16 send second and third signals to the arbitration control 36 of the telematics unit 18. These second and third signals indicate to the arbitration control 36 that the second and third systems 16 would like to communicate with the user. The arbitration control 36 prioritizes the signals (including the first in-progress communication) and selects that signal having the highest priority.

If the in-progress communication is selected as having the highest priority, the communication is allowed to continue. If one of the in-coming communications is selected as having the highest priority, the in-progress communication is temporarily sent to the queue manager 60, and a connection is established between the user and the selected system 16.

In the previous example embodiment, three signals occur substantially simultaneously, so two of the first, second, and third signals are designated as subordinate outputs and are transmitted to the queue manager 60.

Generally, if the signal/communication that is designated as the subordinate output is an interrupted communication between the user and a system 16 offering interactive voice services, the queue manager 60 may maintain (e.g., in the telematics unit memory 26), the state of the menu dialogue as of the time of queuing (or the time of selecting the priority output). After completion of the priority output, the queue manager 60 provides for continuation of the menu dialogue (i.e., the subordinate queued communication), in the state as of the time of queuing. If the signal/communication that is designated as the subordinate output is an interrupted audio message (e.g., a partially dialed phone number), the queue manager 60 may maintain the state of the interrupted audio message as of the time of queuing (or the time of selecting the priority output). As previously described, once the priority output is complete, the queue manager 60 provides for continuation of the audio message in the state as of the time of queuing.

As such, communications from two (or more) in-vehicle systems 16 may "take turns" as the priority and subordinate communications/signals based upon the respective signal's then-current priority level. As a non-limiting example, the telematics unit 18 may receive a communication request from the navigation system 90 while the user is engaging a hands-free calling system to dial a telephone number. The arbitration control 36 of the telematics unit 18 may determine that the navigation system 90 communication is a higher priority than dialing a phone number, and may send such information (i.e., the numbers already requested by the user) to the queue manager 60. The hands-free calling system may be queued to permit one or more of the priority navigation communications (such as, for example, upcoming maneuver commands) to be output. Following the completion of the output of the priority navigation communications, the hands-free calling system may be resumed at the state at which it was queued. It is to be understood that if a subsequent request for communication from the navigation system 90 (or from another in-vehicle system 16) arises and is found to be a higher priority during the communication with the hands-free calling system, the hand-free calling system may again be queued until completion of the then-current priority communication.

In an embodiment in which three or more signals are received and prioritized substantially simultaneously, the arbitration control 36 selects which of the subordinate outputs will be first and second. The queue manager 60 maintains the second subordinate output in the queue for transmission to the vehicle audio system after completion of the first subordinate output (which is transmitted after completion of the priority output).

It is to be understood that the term "completion", as used herein, refers to completion of a portion (i.e., less than an entirety) of a communication with a system 16, as well as completion of a communication in its entirety. The arbitration control 36 may reevaluate the priority (i.e., priority levels) of the pending communications, and any in-coming communications, at predetermined intervals. As such, an in-progress communication (previously deemed the highest priority communication or priority output) may be temporarily "completed," or queued as a subordinate communication, if the arbitration control 36 reevaluates and reassigns the priority of the communications at one of the predetermined intervals. The newly assigned highest priority communication is played via the audio system, and upon its completion, the newly assigned subordinate communication is played. It is to be understood that the arbitration control 36 may reevaluate and/or reassign the priority levels numerous times.

The following includes a non-limiting example of when the arbitration control 36 may reassign priority levels. In an embodiment, a low priority communication may remain in a queue for an inordinate length of time. An aging algorithm may assign a software timer, which may be driven by the real time clock 34, to a queued communication, and may execute the communication, regardless of priority, if the timer times out. For example, uploading vehicle diagnostic data (which utilizes the in-vehicle phone 32) may have a low priority level and may be queued while other communications are taking place. However, if the user is executing a long, complex, and/or dense vehicle route while making several consecutive hands-free telephone calls, then the data upload may be suspended for the duration of the route. With the aid of the aging algorithm, the arbitration control 36 may temporarily switch the data upload to a higher priority, to essentially force the data upload, while potentially temporarily sacrificing the telephone calling or route execution.

Further, it is to be understood that a "predetermined interval" is to be interpreted broadly and may refer to, for example, a reoccurring time, such as every 0.01 second, 0.1 second, one second, two seconds, five seconds, ten seconds, thirty seconds, one minute, or the like. A "predetermined interval" may also include a time when a change in status of a device, such as the telematics system 18, is recognized, such as, for example, upon notification of another incoming communication request. The predetermined interval may be monitored and/or calculated by the real time clock 34.

As a non-limiting example of the system disclosed herein, a user has requested navigation instructions, and the system is in the process of timely altering the user of upcoming navigational instructions. As the system continues to execute the navigation request, the user initiates a phone call by, for example, pressing a button and annunciating the telephone number (i.e., 555-123-4567). In the midst of dialing the phone number, the arbitration control 36 receives a signal that the upcoming navigation instruction is ready for transmission to the user. The arbitration control 36 prioritizes the navigation instruction as having a higher priority as the phone call, and the queue manager 60 interrupts the user/subscriber during the annunciation, and allows the navigational maneuver/instruction (e.g., "turn right ahead.") to be announced to the user. Once the navigation instruction is relayed, the queue manager 60 queries the user if he/she would like to continue placing the call. Since the queue manager 60 is capable of remembering the previous state of the interrupted communication, it is also capable of restoring the user's communication at the point at which it was interrupted (e.g., at the portion of the telephone number that was uttered by the user prior to the interruption). If the user responds affirmatively, then he/she may annunciate the entire phone number, or the remainder of the telephone number that was interrupted. If, for example, the user had uttered the entire phone number prior to the interruption, the queue manager 60 may queue the entire phone number, and, upon completion of the priority output, inquire whether the user would like the number dialed.

In this example, if the user has selected that particular phone number as a higher priority than navigation instructions, the user will be able to finish uttering the telephone number without interruption, and the number will be dialed. The navigation instruction becomes the subordinate output and is queued. However, navigation instructions may be temporary and dynamic. For example, a turn instruction may be configured to be presented to the user at about 300 feet from the actual maneuver, whereby if the user's phone call persists, then the maneuver may not be annunciated, potentially causing the user to miss the turn. In this embodiment, the navigational instructions may be displayed on a display device as the user continues his/her phone call. Alternatively, the arbitration control 36 may override the user's preferred priority levels, and may assign a higher priority to the navigation instruction, thereby signaling the queue manager 60 to queue the phone call and transmit the navigation instruction. Still further, if the system recognizes that the user has strayed from the navigation route, the arbitration control 36 may be configured to assign a higher priority to a message that the vehicle 12 has strayed from the route and may, in response, interrupt the telephone call.

Figure 2:
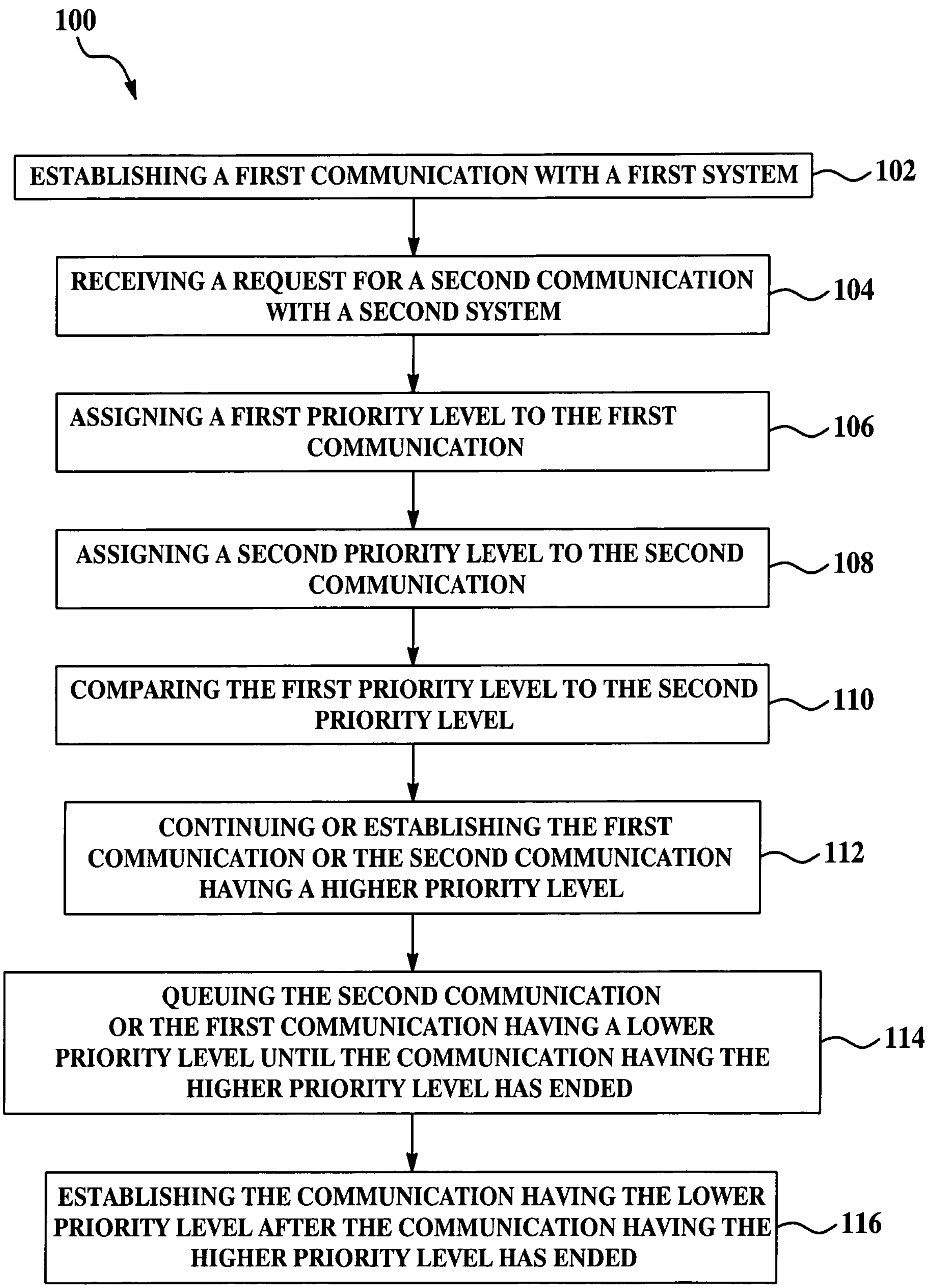
FIG. 2 is a flowchart depicting an embodiment of a method of managing communications for an in-vehicle telematics system.

Referring now to FIG. 2, a method 100 of managing communications for an in-vehicle telematics unit 18 includes establishing a first communication with a first system 16, as depicted at reference numeral 102; and receiving a request for a second communication with a second system 16, as depicted at reference numeral 104. As previously described, the system 16 may be any in-vehicle system 16, including the in-vehicle or mobile phone 32, the navigation system 90 on-board the vehicle 12, etc. Furthermore, the communications may include, for example, incoming calls, navigation instructions, or user communications with 1) a service provider 46; 2) a system 16 (e.g., using the interactive voice service); and/or 3) a third party; and/or the like.

The method also includes assigning a first priority level to the first communication, as depicted at reference numeral 106; assigning a second priority level to the second communication, as depicted at reference numeral 108; and comparing the first priority level to the second priority level, as depicted at reference numeral 110. The communication that is deemed to have the higher priority is either continued or is established, as depicted at reference numeral 112; and the communication that is deemed to have the lower priority is queued until the communication having the higher priority level is completed, as depicted at reference numeral 114. Once the communication having the higher priority status is complete, the method includes establishing the communication having the lower priority level, as depicted at reference numeral 116.

Figure 3:
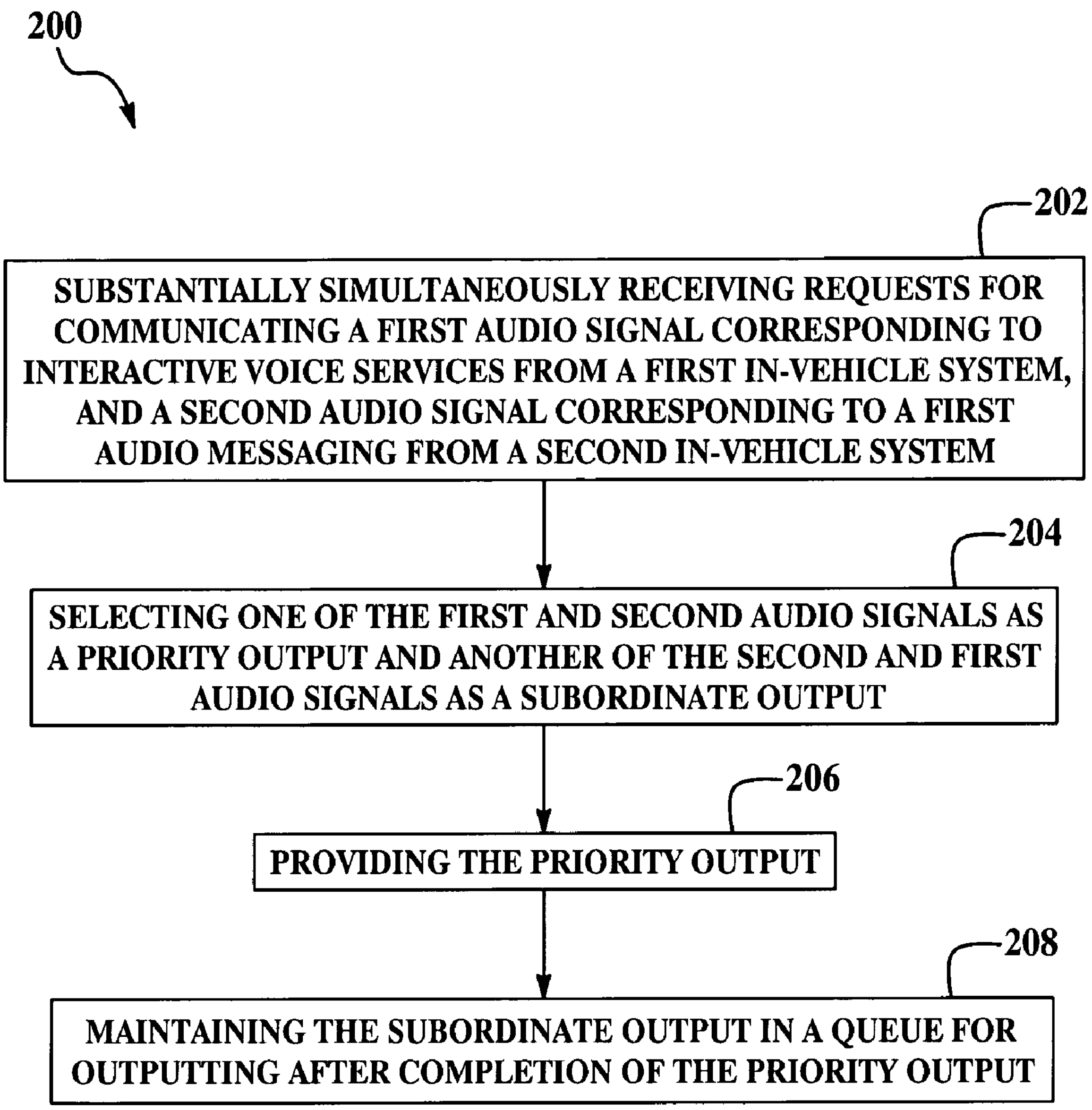
FIG. 3 is a flowchart depicting another embodiment of a method of managing communication for an in-vehicle telematics system.

Referring now to FIG. 3, another embodiment of a method 200 of managing communications for an in-vehicle telematics unit 18 is depicted. This embodiment includes substantially simultaneously receiving, at the in-vehicle telematics unit 18, requests for communicating first and second audio signals via the vehicle audio system, as depicted at reference numeral 202. In the embodiment of FIG. 3, the first audio signal corresponds to interactive voice services from a first in-vehicle system, and the second audio signal corresponds to a first audio messaging from a second in-vehicle system. Generally, the interactive voice services are provided to the user through one or more menu dialogue(s).

The method further includes selecting (e.g., via the arbitration control 36 in the in-vehicle telematics unit 18) one of the first and second audio signals as a priority output and another of the second and first audio signals as a subordinate output, as shown at reference numeral 204. The priority output is then provided over the vehicle audio system, as shown at reference numeral 206. As the priority output is provided, the subordinate output is maintained, by the queue manager 60, in a queue for outputting over the vehicle audio system after completion of the priority output, as shown at reference numeral 208.

In the embodiment shown in FIG. 3, if the first audio signal is the subordinate output, then the queue manager 60 maintains a state of the menu dialogue(s), as of a time the priority output is selected, for continuation of the menu dialogue(s) from the maintained state after the completion of the priority output.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween). Additionally, two components may be permanently, semi-permanently, or releasably engaged with and/or coupled to one another.

Further, it is to be understood that "communication" is to be construed to include all forms of communication, including direct communication and indirect communication. As such, indirect communication includes communication between two components with additional component(s) therebetween.

While several embodiments have been described in detail, it will be apparent to those skilled in the art that the disclosed embodiments may be modified. Therefore, the foregoing description is to be considered exemplary rather than limiting.

The invention claimed is:

1. A method of managing communications for an in-vehicle telematics system, the method comprising:

receiving, at the in-vehicle telematics unit, a request for communicating, via a vehicle audio system, a first audio signal corresponding to interactive voice services from a first in-vehicle system;

providing interactive voice services to an in-vehicle user through at least one menu dialog during which a user-generated request is initiated using the in-vehicle telematics system;

while the interactive voice services are being provided, receiving, at the in-vehicle telematics unit, a request for communicating, via the vehicle audio system, a second audio signal corresponding to a first audio messaging from a second in-vehicle system;

receiving a request for communicating, via the vehicle audio system, a third audio signal corresponding to a second audio messaging from a third in-vehicle system, the request received substantially simultaneously with the request for communicating the second signal;

selecting, via an arbitration control in the in-vehicle telematics unit, one of the second or third audio signals as a priority output, either the first audio signal or an other of the second or third audio signals as a first subordinate output, and a remaining one of the first audio signal or the other of the second or third audio signals as a second subordinate output;

providing the priority output over the vehicle audio system, thereby interrupting the user-generated request; and maintaining, via an queue manager, the first subordinate output in a queue for outputting over the vehicle audio system after completion of the priority output; and maintaining, via the queue manager, the second subordinate output in the queue for outputting over the vehicle audio system after completion of the first subordinate output;

wherein the first or second subordinate output includes the user-generated audio request and wherein the maintaining of the first or second subordinate output includes maintaining a state of the user-generated request, as of a time the priority output is selected, for continuation of the user-generated request from the maintained state after the completion of the priority output or after completion of the first subordinate output.

2. The method of claim 1 wherein the first in-vehicle system is an in-vehicle phone and wherein the second in-vehicle system is selected from the in-vehicle phone, an in-vehicle navigation system, a server-based navigation system, and combinations thereof.

3. The method of claim 1 wherein at least one of the first in-vehicle system or the second in-vehicle system operatively connects a user to a call center service advisor selected from an automated advisor and a human advisor.

4. The method of claim 1 wherein at least one of the first in-vehicle system or the second in-vehicle system is in communication with a two-way radio frequency communication system.

5. The method of claim 4 wherein the two-way radio frequency communication system includes at least one of a wireless carrier system, a communications network, a land network, or combinations thereof.

6. The method of claim 1, further comprising providing the first subordinate output over the vehicle audio system after completion of the priority output.

7. A system, comprising:

a first in-vehicle system providing interactive voice services through at least one menu dialogue, the interactive voice services including a first audio signal configured to be provided over a vehicle audio system;

a user-generated request initiated during use of the interactive voice services, the user-generated request being a request for dialing a phone number;

a second in-vehicle system providing first audio messaging including a second audio signal configured to be provided over the vehicle audio system;

an arbitration control coupled to the first and second in-vehicle systems, the arbitration control adapted to select, when the first and second audio signals occur substantially simultaneously, the second audio signal as a priority output and the first audio signal as a subordinate output, wherein the priority output is provided over the vehicle audio system; and a queue manager i) adapted to maintain a state of the user-generated request, as of a time the priority output is selected, for continuation of the user-generated request from the maintained state after the completion of the priority output, wherein the maintained state is selected from an articulated phone number, a partially articulated phone number, and a partially dialed phone number and ii) adapted to ask an in-vehicle user whether the articulated phone number should be dialed, or for a remainder of the partially articulated phone number, or whether the partially dialed phone number should be completed to place a call.

8. The system of claim 7 wherein the first in-vehicle system is an in-vehicle phone and wherein the second in-vehicle system is selected from the in-vehicle phone, an in-vehicle navigation system, a server-based navigation system, and combinations thereof.

9. The system of claim 7 wherein at least one of the first in-vehicle system or the second in-vehicle system operatively connects a user to a call center service advisor selected from an automated advisor and a human advisor.

10. The system of claim 7 wherein at least one of the first in-vehicle system or the second in-vehicle system includes a two-way radio frequency communication system.

11. A method of managing communications for an in-vehicle telematics system, the method comprising:

receiving, at the in-vehicle telematics unit, a request for communicating, via a vehicle audio system, a first audio signal corresponding to interactive voice services from a first in-vehicle system;

providing interactive voice services to an in-vehicle user through at least one menu dialog during which a user-generated request is initiated using the in-vehicle telematics system;

while the interactive voice services are being provided, receiving, at the in-vehicle telematics unit, a request for communicating, via the vehicle audio system, a second audio signal corresponding to a first audio messaging from a second in-vehicle system;

selecting, via an arbitration control in the in-vehicle telematics unit, second audio signal as a priority output and the first audio signals as a subordinate output;

providing the priority output over the vehicle audio system, thereby interrupting the user-generated request; and maintaining, via a queue manager, the subordinate output in a queue for outputting over the vehicle audio system after completion of the priority output;

wherein the maintaining includes maintaining a state of the user-generated request, as of a time the priority output is selected, for continuation of the user-generated request from the maintained state after the completion of the priority output;

wherein the user-generated request is a request for dialing a phone number, wherein the maintained state is a partially dialed phone number, and wherein after completion of the priority output, the method further comprises asking the in-vehicle user whether the partially dialed phone number should be completed to place a call.

12. A method of managing communications for an in-vehicle telematics system, the method comprising:

receiving, at the in-vehicle telematics unit, a request for communicating, via a vehicle audio system, a first audio signal corresponding to interactive voice services from a first in-vehicle system;

providing interactive voice services to an in-vehicle user through at least one menu dialog during which a user-generated request is initiated using the in-vehicle telematics system;

while the interactive voice services are being provided, receiving, at the in-vehicle telematics unit, a request for communicating, via the vehicle audio system, a second audio signal corresponding to a first audio messaging from a second in-vehicle system;

selecting, via an arbitration control in the in-vehicle telematics unit, second audio signal as a priority output and the first audio signals as a subordinate output;

providing the priority output over the vehicle audio system, thereby interrupting the user-generated request; and maintaining, via a queue manager, the subordinate output in a queue for outputting over the vehicle audio system after completion of the priority output;

wherein the maintaining includes maintaining a state of the user-generated request, as of a time the priority output is selected, for continuation of the user-generated request from the maintained state after the completion of the priority output;

wherein the user-generated request is a request for dialing a phone number, wherein the maintained state is a partially articulated phone number, and wherein after completion of the priority output, the method further comprises asking the in-vehicle user for a remainder of the partially articulated phone number.

13. A method of managing communications for an in-vehicle telematics system, the method comprising:

receiving, at the in-vehicle telematics unit, a request for communicating, via a vehicle audio system, a first audio signal corresponding to interactive voice services from a first in-vehicle system;

providing interactive voice services to an in-vehicle user through at least one menu dialog during which a user-generated request is initiated using the in-vehicle telematics system;

while the interactive voice services are being provided, receiving, at the in-vehicle telematics unit, a request for communicating, via the vehicle audio system, a second audio signal corresponding to a first audio messaging from a second in-vehicle system;

selecting, via an arbitration control in the in-vehicle telematics unit, second audio signal as a priority output and the first audio signals as a subordinate output;

providing the priority output over the vehicle audio system, thereby interrupting the user-generated request; and maintaining, via a queue manager, the subordinate output in a queue for outputting over the vehicle audio system after completion of the priority output;

wherein the maintaining includes maintaining a state of the user-generated request, as of a time the priority output is selected, for continuation of the user-generated request from the maintained state after the completion of the priority output;

wherein the user-generated request is a request for dialing a phone number, wherein the maintained state is an articulated phone number, and wherein after completion of the priority output, the method further comprises asking the in-vehicle user whether dialing of the articulated phone number should be completed.

* * * * *